Oct. 8, 1968          C. BRECHER ET AL          3,405,372
OPTICAL MASER UTILIZING A LIQUID MEDIUM CONTAINING
A CHELATE OF EUROPIUM AND DIBENZOYLMETHANE
Filed Nov. 2, 1964

INVENTORS.
CHARLES BRECHER
ALEXANDER LEMPICKI
HAROLD SAMELSON

BY R. J. Frank
ATTORNEY.

United States Patent Office 3,405,372
Patented Oct. 8, 1968

3,405,372
OPTICAL MASER UTILIZING A LIQUID MEDIUM CONTAINING A CHELATE OF EUROPIUM AND DIBENZOYLMETHANE
Charles Brecher, Flushing, Alexander Lempicki, New Hyde Park, and Harold Samelson, New York, N.Y., assignors to General Telephone and Electronics Laboratories, Inc., a corporation of Delaware
Filed Nov. 2, 1964, Ser. No. 407,961
6 Claims. (Cl. 331—94.5)

ABSTRACT OF THE DISCLOSURE

An optical maser utilizing a liquid active medium which is a solution containing a chelate of europium and dibenzoylmethane in a solvent which is a mixture of alcohol and dimethylformamide.

---

This invention relates to optical masers and in particular to a maser in which stimulated emission is obtained by employing a solution containing a chelate of europium and dibenzoylmethane.

The term "maser" is an acronym for "microwave amplification by stimulated emission of radiation" and an optical maser, or laser, is a maser designed for producing stimulated radiation at a frequency falling within the range of light frequencies. Light frequencies are defined as those frequencies falling within the band including the infrared and ultraviolet or between $2 \times 10^6$ angstroms and 100 angstroms.

The operation of maser devices depends upon the interaction of radiation and matter. More particularly, according to present theory, radiation consists of an accumulation of photons, each of which has a quantity of energy associated with it. This accumulation of photons constitutes an electromagnetic wave. When all photons have the same energy, the wave will have one frequency uniquely determined by the photon energy. When the photons have different energies, the wave will contain a plurality of wave components of different frequencies, these frequencies corresponding to the various photon energies.

Interaction of radiations with matter ensues when matter (i.e. atoms or molecules) either absorbs or emits photons. Usually, atoms and molecules exist in a stable non-radiating or ground state in which energy is not emitted. This state corresponds to a fixed quantity or level of internal energy. When an atom is in the ground state and interacts with an incident photon, the atom can absorb the energy of the photon and be placed in a higher or "excited" state, provided that the energy of the photon is at least equal to the difference in energy of the ground and excited states. Similarly, when the energy level of an atom is suddenly changed from one state to a lower energy state, a photon of radiation may be produced. The energy of this photon will be equal to the difference in energy between these states.

An atom in an excited state can emit a photon spontaneously and revert to its ground state or to some intermediate state. However, during the period in which the atom is still excited, it can be stimulated to emit a photon by interacting with an incident photon if the energy of this photon is equal to that of the photon which would otherwise be emitted spontaneously. As a result, the incoming photon or wave is augmented by the one given up by the excited atom. This released wave falls in phase with the wave that triggered its release. Hence, an amplifying action ensues. This phenomenon is known as stimulated emission.

Under ordinary conditions, there are more atoms in the lower energy states than in the higher states. In the maser, the distribution of electrons among the energy levels is changed by a process of "pumping" so that there will be more atoms in the higher than in the lower states. (The process of pumping consists of injecting electromagnetic energy into the assemblage of atoms to raise the atoms into excited states.) Then incident photons of the lowest energy can produce more downward than upward transitions and stimulated emission can be produced.

In the maser, a suitable active material is enclosed in a cavity resonator having at least two separated reflecting walls. A wave starting out anywhere between the walls of the chamber will grow in amplitude until the wave reaches either wall where it will be reflected back into the medium. Inevitably there are losses due to imperfect reflections, absorption and scattering. However, if the amplification by stimulated emission is large enough to compensate for these losses, a steady wave can build up in the resonator.

A wave that starts at any position between the reflecting ends of the resonator will travel toward one end with increasing amplitude. When it reaches the end, the wave is reflected back toward the starting point with further increase in amplitude. The gain in energy of the wave during repeated passages compensates for losses at the reflecting surfaces and elsewhere and a steady wave will build up. Each time the wave is reflected at an end, a very small portion of the wave passes through this end. This portion is continually reinforced because of repeated reflections and, thus reinforced, constitutes the maser output wave.

The output of the maser is highly directional since the waves which are emitted must make many repeated passages without deviating very much from a path along the axis of the resonator. (If a wave is inclined at an angle with respect to this path, it will leave the resonator after few if any repeated reflections and will not have the opportunity to grow appreciably in amplitude.) The output waves are monochromatic (i.e. have essentially a single frequency) since stimulated emission takes place most strongly at frequencies in the middle of the band of frequencies emitted by spontaneous radiation. The initial stimulated emission at these frequencies will cause further emission at the same frequencies so that the output waves will contain only an extremely narrow range of frequencies or wavelengths.

Optical masers employing solid maser materials are well known. In a typical solid state optical maser, the active material comprises a crystalline body such as a single crystal of chromium doped ruby formed in a circular cylinder having partially silvered optically flat end surfaces. The fabrication of material of this type requires careful control of dimensions and preparation of the reflecting surfaces. Further, once such a crystal has been formed its characteristics can not be readily modified.

Gaseous optical masers, which typically employ a mixture of neon and helium gases confined within an elongated glass tube sealed at both ends, are also well known. However, the gas filled maser must be carefully sealed to prevent contamination of the gas and, once sealed, the gas cannot be changed without destroying the seals.

Accordingly it is an object of our invention to provide an optical maser which overcomes the disadvantages of the solid and gas masers in that it may be readily fabricated and the active material easily replaced or modified.

Another object is to provide an optical maser in which the active material is a liquid.

In the present invention an optical maser is provided in which a cavity having spaced apart reflecting surfaces is filled with a solution of the chelate, the anion europium tetrakis dibenzoylmethide. The solvent is a mixture of alcohol and dimethylformamide

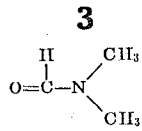

in a ratio between 2:1 and 4:1. A chelate is defined as a molecular structure in which a ring can be formed by the residual valences (unshared electrons) of neighboring atoms. A rare earth chelate is a chelate having a metallic element selected from the group consisting of those elements having atomic numbers between 57 and 71 inclusive.

Stimulated radiation is obtained from this device by a mechanism which is believed to be as follows. When light of the proper wavelength is incident on the compound, energy is absorbed by the chelating agent (dibenzoylmethide) and a transition occurs from the ground state to a higher level (defined as a singlet). The chelating agent then relaxes to a triplet state intermediate the ground and singlet states following which there is a transfer of energy to the rare earth europium ion. Subsequently, there is a decay to an energy level somewhat above the ground level resulting in stimulated radiation in the visible spectrum.

The optical cavity consists essentially of a transparent cylinder having transparent pistons at each end. The surfaces of the pistons facing the inside of the cavity are partially reflecting so that a portion of the light striking them will be reflected while the remainder of the light is transmitted through the piston. The pistons are precisely fabricated to permit them to slide within the cylinder without allowing the liquid in the cavity to leak out.

In order to produce an optical maser, one of the pistons is inserted in the cylinder, the alcohol solution of europium tetrakis dibenzoylmethide placed in the cavity, and the other piston inserted in the cylinder. The cylinder is then cooled and the solution irradiated by light from an external source. This procedure stimulates emission which is transmitted through the partially reflecting mirrors.

The above objects of and the brief introduction to the present invention will be more fully understood and further objects and advantages will become apparent from a study of the following description in connection with the drawings, wherein.

Figure 1:
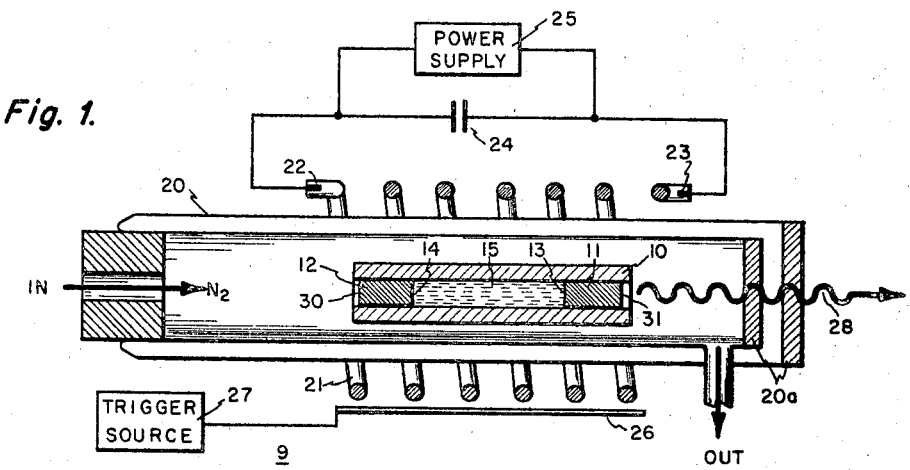
FIG. 1 is a schematic representation of an optical maser employing a liquid active material.

Referring to FIG. 1, there is shown an optical maser 9 comprising a hollow transparent cylinder 10 which may be made of quartz or other optically transparent material having a low temperature coefficient of expansion. By optically transparent it is meant that the walls of cylinder 10 transmit radiation with negligible attenuation at the frequency required to pump the maser. The bore of cylinder 10 is accurately and uniformly ground and first and second quartz pistons 11 and 12 are inserted in the ends of the cylinder forming a very close sliding fit. These pistons are transparent to the radiation emitted by the maser. The inner faces 13 and 14 of pistons 11 and 12 are optically polished to provide high quality spherical surfaces and high dielectric mirrors are evaporated onto these surfaces. The mirror evaporated on to face 13 is approximately 99% reflecting for those wavelengths at which emission is obtained from the device whereas the mirror evaporated on to face 14 is totally reflecting. A more detailed description of this device is disclosed in application Ser. No. 276,890 filed Apr. 30, 1963 by A. Lempicki and K. Weise which nurtured into Patent No. 3,319,183 on May 9, 1967.

The cavity 15 defined by the inside of cylinder 10 and mirrors 13 and 14 is completely filled with a solution of the europium tetrakis dibenzoylmethide anion in the alcohol-dimethylformamide solvent. The range of concentration is from $1 \times 10^{-3}$ moles per liter to the limit of solubility of this compound in the solvent. The cation associated with the complex anion, europium tetrakis dibenzoylmethide may be piperidinium or the cation of a similar organic base such as pyrrolidine, tetramethyl ammonium or diethyl amine. The alcohol used in the solvent can be ethyl, methyl, propyl or any mixture of these.

Figure 2:
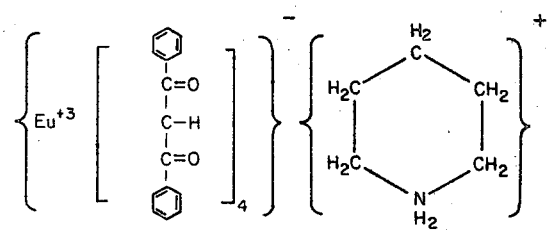
FIG. 2 shows the structural formula for the anion europium tetrakis dibenzoylmethide.

The structure of the anion is given in FIG. 2. This complex anion is a chelate of trivalent europium with the four enolate ions of dibenzoylmethane

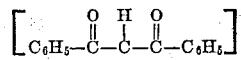

The complete complex has a single negative charge which is compensated by piperidinium, $C_5H_{12}N$, in the case shown but the other organic bases mentioned can also be used.

The europium tetrakis dibenzoylmethide was synthesized using a method described at pages 10 et seq. in the book "Inorganic Synthesis," vol. II, by W. C. Fernelius, published by McGraw-Hill Book Co., Inc., New York, 1946. In accordance with this method, a solution of dibenzoylmethane in 95% ethanol was made, the amount of dibenzoylmethane being that required to produce the stated compound with europium. A stoichiometric amount of piperidine was then added to the dibenzoylmethane solution. Following this a solution of europium chloride ($EuCl_3 \cdot 6H_2O$) in 95% ethanol was slowly stirred into the original solution. The volume of the resulting solution and precipitate was reduced by 50%, the precipitate filtered off, washed several times with 95% ethanol, and then air dried.

The cylinder 10 is placed in a hollow-walled tube 20, such as a Dewar flask having quartz window 20a at one end and a helical high-intensity xenon flash lamp 21 placed around the tube. The hollow wall of tube 20 is evacuated. Electrodes 22 and 23 are connected to the ends of the helical flash tube 21 and a capacitor 24 coupled between the terminals. A power supply 25 maintains a constant voltage of about 10 kilovolts across capacitor 24.

The cylinder 10 is maintained at a temperature in the range $-120°$ C. to $-170°$ C. by circulating precooled nitrogen gas through the tube 20. The cell design provides a high Q (about $10^6$) optical cavity and, because of the sliding pistons, compensates for the contraction of the solution (about 0.001 cm./cm.° K.) as it is cooled.

When the xenon lamp is flashed by applying a 20–30 kilovolt trigger pulse to wire 26 from trigger source 27, energy is absorbed by the europium tetrakis dibenzoylmethide and, by the mechanism discussed previously, stimulated radiation is obtained through piston 11 as indicated by arrow 23. Alternatively, both of the pistons may be partially reflecting and the output will be obtained from both ends of the device. The wavelength of the absorbed radiation is in the approximate range 3500 to 4500 angstroms. Stimulated radiation has been obtained at a wavelength of approximately 6120 angstroms.

Figure 3A:
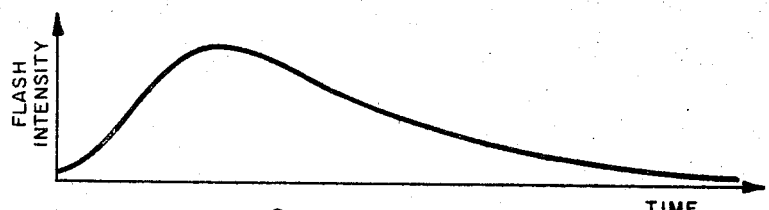
FIGS. 3a and 3b are idealized drawings of oscillograms illustrating the flash intensity and output of the optical maser.
Figure 3B:
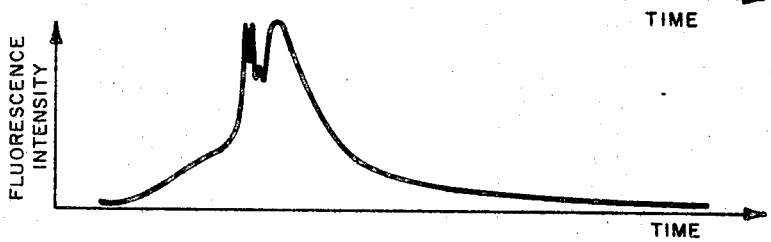

FIGS. 3a and 3b show oscillograms of the radiation obtained from the output of a photomultiplier when the optical maser was stimulated by a flash from a xenon lamp having a duration of one millisecond and an energy input of 3000 joules. The bore of the quartz cylinder 10 has a diameter of 4 millimeters and the radius of curvature of the mirrors is about 5 centimeters. The solution consisted of ethyl alcohol and dimethylformamide in the ratio 4 to 1 and the concentration of europium tetrakis dibenzoylmethide in the solution was $5.2 \times 10^{18}$ molecules per cubic centimeter.

The flash intensity is shown plotted against time in FIG. 3a and the fluorescence intensity of the light emitted is shown in FIG. 3b. The relaxation oscillations shown in FIG. 3b are characteristic of the operation obtained with optical masers.

Figure 4:
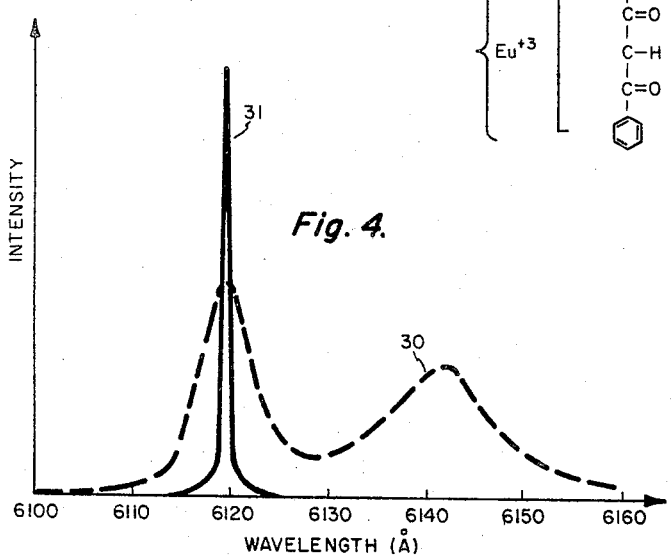
FIG. 4 shows the idealized spectral distribution of radiation emitted by the maser.

FIG. 4 shows the spectral distribution of radiation emitted by the maser. The horizontal axis corresponds to a wavelength scale in angstroms and the vertical scale to radiation intensity in arbitrary units. Dashed trace 30 shows the spectral distribution when the optical maser was energized below the critical input energy (approximately 1000 joules) and the solid curve 31 indicates the spectral distribution when the maser was energized above the critical input energy.

For excitation below the critical value the emission consists of two broad lines at 6120 and 6142 angstroms. Above the critical input energy, as shown by the solid curve 31, the emitted stimulated radiation occurs only at 6120 angstroms and the width of the emission line is decreased from about 8 angstroms to less than 0.3 angstrom.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. An optical maser comprising
   (a) a resonant cavity having spaced apart reflecting surfaces at opposite ends thereof, at least one of said surfaces being partially transmissive,
   (b) a solution of europium tetrakis dibenzoylmethide located within said cavity,
   (c) means for irradiating said solution by light from an external source whereby emission is stimulated in said solution and transmitted through said at least one surface.

2. An optical maser comprising
   (a) a resonant cavity having spaced apart reflecting surfaces at opposite ends thereof, at least one of said surfaces being partially transmissive,
   (b) a solution of europium tetrakis dibenzoylmethide in a solvent consisting of alcohol and dimethylformamide located within said cavity,
   (c) means for irradiating said solution by light from an external source whereby emission is stimulated in said solution and transmitted through said at least one surface.

3. An optical maser comprising
   (a) a resonant cavity having spaced apart reflecting surfaces at opposite ends thereof, at least one of said surfaces being partially transmissive,
   (b) a solution located within said cavity, said solution comprising the anion europium tetrakis dibenzoylmethide and an organic base cation in a solvent consisting essentially of alcohol and dimethylformamide,
   (c) means for irradiating said solution by light from an external source whereby emission is stimulated in said solution and transmitted through said at least one surface.

4. An optical maser comprising
   (a) a resonant cavity having spaced apart reflecting surfaces at opposite ends thereof, at least one of said surfaces being partially transmissive,
   (b) a solution located within said cavity, said solution comprising the anion europium tetrakis dibenzoylmethide and an organic base cation selected from the group consisting of pyrrolidine, tetramethyl ammonium and diethyl amine in a solvent consisting essentially of dimethylformamide and an alcohol selected from the group consisting of ethyl, methyl and propyl,
   (c) means for irradiating said solution by light from an external source whereby emission is stimulated in said solution and transmitted through said at least one surface.

5. An optical maser comprising
   (a) a resonant cavity having spaced apart reflecting surfaces at opposite ends thereof, at least one of said surfaces being partially transmissive,
   (b) a solution located within said cavity, said solution comprising the anion europium tetrakis dibenzoylmethide in a solvent consisting of alcohol and dimethylformamide, the concentration of europium tetrakis dibenzoylmethide in said solvent being not less than $1 \times 10^{-3}$ moles per liter,
   (c) means for irradiating said solution by light from an external source whereby emission is stimulated in said solution and transmitted through said at least one surface.

6. The optical maser defined by claim 5 wherein the ratio of alcohol to dimethylformamide in said solvent is between 2:1 and 4:1.

References Cited

Schimitschek et al.: Laser Action in Europium Dibenzoylmethide, J. App. Phys., vol. 35, No. 9 (September 1964), pp. 2786 and 2787.

JEWELL H. PEDERSEN, *Primary Examiner.*

W. L. SIKES, *Assistant Examiner.*